(12) United States Patent
He et al.

(10) Patent No.: US 7,978,615 B2
(45) Date of Patent: Jul. 12, 2011

(54) METHOD OF OPERATING A NETWORK

(75) Inventors: Liwen He, Ipswich (GB); Bryan Littlefair, Bury St Edmonds (GB)

(73) Assignee: British Telecommunications PLC, London (GB)

(*) Notice: Subject to any disclaimer, the term of this patent is extended or adjusted under 35 U.S.C. 154(b) by 89 days.

(21) Appl. No.: 12/278,196

(22) PCT Filed: Jan. 31, 2007

(86) PCT No.: PCT/GB2007/000332
§ 371 (c)(1),
(2), (4) Date: Aug. 4, 2008

(87) PCT Pub. No.: WO2007/088361
PCT Pub. Date: Aug. 9, 2007

(65) Prior Publication Data
US 2009/0016356 A1    Jan. 15, 2009

(30) Foreign Application Priority Data
Feb. 3, 2006   (EP) .................................... 06250594

(51) Int. Cl.
G01R 31/08    (2006.01)

(52) U.S. Cl. ........ 370/242; 370/244; 370/248; 370/252; 370/395.31

(58) Field of Classification Search .................. None
See application file for complete search history.

(56) References Cited

U.S. PATENT DOCUMENTS

| | | | | |
|---|---|---|---|---|
| 6,757,258 | B1 * | 6/2004 | Pillay-Esnault | 370/254 |
| 7,426,569 | B2 * | 9/2008 | Dunk | 709/232 |
| 2002/0004843 | A1 | 1/2002 | Andersson et al. | |
| 2002/0093954 | A1 | 7/2002 | Weil et al. | |
| 2002/0167898 | A1 | 11/2002 | Thang et al. | |
| 2002/0174216 | A1 * | 11/2002 | Shorey et al. | 709/224 |
| 2002/0186654 | A1 * | 12/2002 | Tornar | 370/225 |

(Continued)

FOREIGN PATENT DOCUMENTS
EP    1 324 515    7/2003
(Continued)

OTHER PUBLICATIONS

Sandick, H., et al., "Fast LIveness Protocol (FLIP)," Working Group, Internet Draft, draft-sandiick-flip.00.txt, Nortel Networks, Feb. 2000.

(Continued)

Primary Examiner — Anthony Sol
(74) Attorney, Agent, or Firm — Nixon & Vanderhye PC

(57) ABSTRACT

Techniques are provided for operating a network where router devices forward received data packets towards a destination node. Each router maintains a routing table, indicating the next hop to choose in respect of different ultimate destinations m accordance with a routing protocol. Periodic communications between neighboring routers are used as confirmation that they are still able to communicate with one another. Each router compares the time since it last communicated in this way with each of its neighbors with a router dead interval and determines that the respective neighboring router, or the currently designated route thereto, has gone down if the comparison indicates that the router dead interval has elapsed without such a communication having been received. Each router performs an adaptive algorithm to modify the or each corresponding router dead interval dynamically in accordance with one or more properties of the network as measured by the router.

18 Claims, 8 Drawing Sheets

U.S. PATENT DOCUMENTS

| | | | |
|---|---|---|---|
| 2003/0016624 A1 | 1/2003 | Bare | |
| 2005/0135233 A1 | 6/2005 | May | |
| 2005/0152286 A1* | 7/2005 | Betts et al. | 370/255 |
| 2006/0146704 A1* | 7/2006 | Ozer et al. | 370/229 |

FOREIGN PATENT DOCUMENTS

| | | |
|---|---|---|
| EP | 1 324 515 A2 | 7/2003 |

OTHER PUBLICATIONS

The Hello packet, freesoft.org, printed from the internet on Apr. 21, 2005 http://www.freesoft.org/CIE/RFC/1583/104.htm.

Alaettinoglu, C., et al., "Towards Milli-Second IGP Convergence," Internet Draft, Internet Engineering Task Force, draft-alaettinoglu-ISIS-convergence-00, Nov. 2000.

Shaikh, A. et al., "Routing Stability in Congested Networks: Experimentation and Analysis," ACM SIGCOMM Computer Communication Review archive, vol. 30, No. 4 (Oct. 2000), pp. 163-174, ISSN:0146-833.

Porter, G., "Stability Issues in OSPF Routing," Basu and Riecke, NETREAD, Spring 2002, Jan. 31, 2002, EECS—UC Berkeley.

Maunder A.S., "Explicit Marking and Prioritized Treatment of Specific IGP Packets for Faster IGP Convergence and Improved Network Scalability and Stability," draft-ietf-ospf-scalability-00.txt, Internet Engineering Task Force, Internet Draft, Mar. 2001.

Maunder, A.S., et al. "Explicit Marking and Prioritized Treatment of Specific IGP Packets for Faster IGP Convergence and Improved Network Scalability and Stability," draft-ietf-ospf-scalability-00.txt, Mar. 21, 2001, Slides 1-11, http://www.ietf.org/proceedings/01mar/slides/ospf-1/sld001.htm.

Goyal, M., et al., "Achieving Faster Failure Detection in OSPF Networks," IEEE, 2003, pp. 296-300, ISBN: 0-7803-7802-4.

International Search Report for PCT/GB2007/000332 mailed Apr. 5, 2007.

* cited by examiner

| | | | | |
|---|---|---|---|---|
| 0 | 8 | 16 | 24 | 31 |

| | | | |
|---|---|---|---|
| OSPF Header with type = 1 | | | |
| Network Mask | | | |
| Hello Interval | CPU utilisation rate | Options | Router Priority |
| Router Dead Interval | | | |
| Designated Router | | | |
| Backup Designated Router | | | |
| Neighbour$_1$, IP Address | | | |
| ⋮ | | | |
| Neighbour$_n$, IP Address | | | |

Figure 4

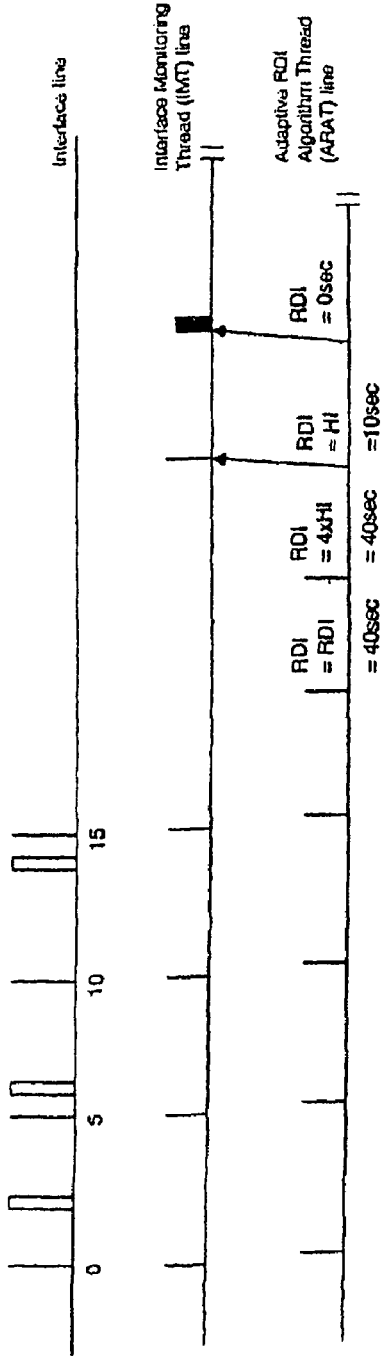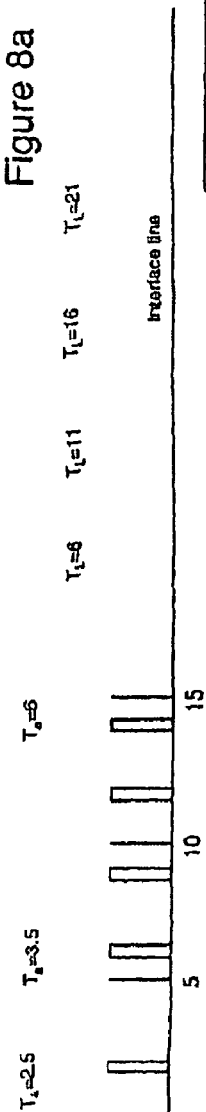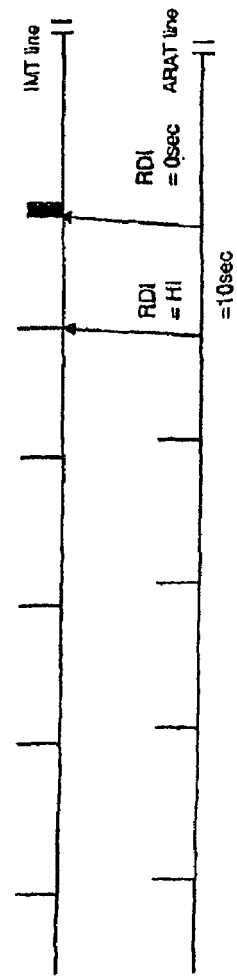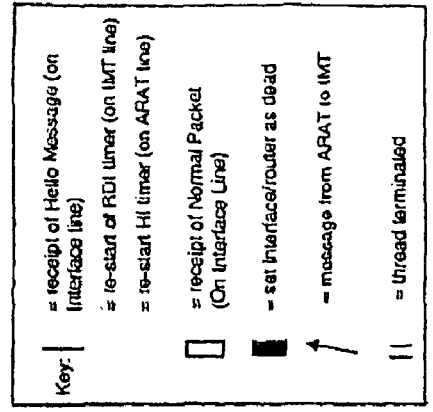
Figure 8a
Figure 8b

METHOD OF OPERATING A NETWORK

This application is the U.S. national phase of International Application No. PCT/GB2007/000332 filed 31 Jan. 2007 which designated the U.S. and claims priority to European Patent Application No. 06250594.6 filed 3 Feb. 2006, the entire contents of which are hereby incorporated by reference.

TECHNICAL FIELD

The present invention relates to a method of operating a network. In particular, the present invention relates to a method of operating a data network or internetwork (i.e. a collection of different networks linked together, the most well known example of which is the Internet), as well as to a network or internetwork operating in accordance with such a method and individual devices operable to carry out such a method within such a network.

BACKGROUND

The Internet is a collection of different packet-switched networks linked together to form an internetwork. In order to successfully send data from one node on the Internet to another, a protocol referred to as the Internet Protocol (IP) is used. This enables an IP datagram to be routed through the Internet from a transmitting or originating source node to a receiving or terminating destination node. As will be well known to persons skilled in the art of data networks, IP is a layer 3 or network layer protocol when compared with the ISO seven layer reference model of data networks. This essentially means that it is responsible for carrying data over multiple hops across a network or internetwork. Thus at each hop the ultimate IP address is read and an onward route is selected unless the data happens to have arrived at the destination node in which case it is passed up the layer stack.

Thus, IP is a data-oriented protocol used by source, destination and intermediate nodes (which might, for example, be a web server, a web client and multiple routers respectively) for communicating data across a packet-switched network (or, more usually, an internetwork). Furthermore, IP has the property that no specific set-up process is required before a source node attempts to transmit data to a destination node, irrespective of whether the nodes have previously communicated with one another before and irrespective of the type of data to be transmitted.

In order to achieve this, IP specifies that data is transmitted in IP datagrams, each of which comprises a header portion and a payload portion. The data to be transmitted (or a portion of it) is carried in the payload portion of an IP datagram whilst the header contains information which enables intermediate routers to process the datagram as a whole in an appropriate manner to try to deliver it to the destination node.

As mentioned above, IP represents only one layer of functionality out of many provided by an internetwork in order to enable data to be successfully transmitted over the internetwork which, by comparison with the seven layer OSI Reference Model, corresponds approximately to layer 3, the Network layer. "Beneath" the network layer is both a link layer and a physical layer in the OSI reference model, and therefore each IP datagram is likely to be encapsulated within at least one lower layer (i.e. the link layer) data packet(s) for transmission from one node on a network to another on the same network. However, each node will "strip out" the IP datagram from the received packet(s) and pass this to an IP function within each intermediate node, as well as at the destination node. The IP function within each intermediate node then reads the IP header portion to determine if it is the destination node. If it is the destination node, it will pass the contents of the payload portion of the IP datagram to the next "higher" layer function identified in the header portion of the IP datagram (e.g. to a Transport Control Protocol (TCP) function or to a User Datagram Protocol (UDP) function), it not, it will try to forward on the IP datagram towards the destination node—the mechanics of this are described in greater detail below.

Intermediate nodes which are connected to multiple different networks and which are therefore important interconnecting nodes, often having many direct connections with other nodes, are typically known as routers or gateways and usually perform data transfer as their sole or primary purpose. In order to allow a large internetwork to continue to be able to deliver IP datagrams correctly even in the event of changes to the internetwork (such as for example links or routers going down and coming back up again, or additional links or routers being added to the network to increase capacity), routers, at least (as opposed to host computers residing at the edge of the network), will tend to use a dynamic routing protocol to maintain their routing tables up to date automatically (hosts at the edge of the network may use a very simple static routing table which passes all IP datagrams, not destined for the host, to a single IP address as the next hop over a single interface to the network).

Internetworks can generally be considered as hierarchical entities which can be viewed at different scales. At a high level scale one can consider so-called Autonomous Systems (AS's). These will generally be connected together to form an internetwork of AS's. Each AS will typically comprise a network itself or even an internetwork, itself being formed from a number of smaller networks or subnetworks. Routers which connect different AS's together are often referred to as Border Gateways. In order to route traffic over an internetwork formed from a plurality of AS's, each AS maintains a routing table setting out to which neighbouring AS traffic should be sent in order to reach any given IP destination address. In some internetworks, these routing tables may be maintained in an autonomous manner using a protocol known as Border Gateway Protocol (BGP) of which the most current version at the filing date of the present application is BGP version 4 (see IETF's RFC 1771). With BGP Transport Control Protocol (TCP) connections are established between BGP "speakers" (i.e. border gateway routers) in order to transfer routing information between border gateway routers. Having set up a TCP connection with another BGP speaker, the connection is maintained indefinitely (unless one speaker or the other closes the connection or if there is some fault which causes the connection to be broken). Once a connection has been set up and initial routing information passed between the connected BGP speakers, the speakers only send further "updates" whenever there has been some significant change in the routing information held by one party or the other. In order to enable one party to determine if the other has gone down without closing the TCP connection, the routers may agree to periodically send "KEEPALIVE messages" and to maintain a "Hold Timer" which is reset whenever a KEEPALIVE message is received. In a typical implementation, the hold timer would timeout after 3 seconds and each party would send the other a KEEPALIVE message about every 1 second (routers are not permitted to send KEEPALIVE messages—over a particular TCP connection—more frequently than one every second).

Within an autonomous system, a similar mechanism is used to route IP datagrams through the network (or internetwork of sub-networks) from one point to another in which each router (and each host) again maintains a routing table. However, instead of using BGP, an Interior Gateway Protocol (IGP) is used instead. There are a number of IGP's currently in use. Dynamic routing protocols in general and IGP's in particular may be classified into two distinct types of protocol: distance vector routing protocols and link state routing protocols. One popular IGP for relatively small networks is Routing Information Protocol (RIP) which is a distance vector routing protocol which uses the User Datagram Protocol (UDP) to transmit routing information (using so-called routing-update messages) between co-operating routers instead of forming TCP connections. Using RIP, a gateway host (with a router) sends its entire routing table (which lists all the other hosts it knows about) to its closest neighbour host every 30 seconds as well as whenever there is a change in the network topology detected by a host. Upon receipt of a neighbour's routing table, each host checks to see if it needs to update its routing table in view of the newly received neighbour's routing table (e.g. because one of the routes to a particular destination, for which the sending neighbour host is currently set as the first hop in the receiving host's router table, has changed as far as the neighbour host is concerned since it last broadcast its routing table, or because a destination, for which the neighbour host is not currently set as the first hop, now appears from the received routing table to be reachable by a shorter route via the sending neighbour than via the neighbour currently set as the first hop). Since each neighbour host passes the information about its current routing table on to all of its neighbours and so on, all hosts within the network should eventually end up having routing tables which are self-consistent and specify the best (according to whatever metric is used) routes between hosts on the network, a state known as network convergence. Generally, RIP uses hop count as a way to determine network distance. (Other protocols use more sophisticated algorithms that may, for example, include delay, cost, etc. as well.)

The discussion above assumes that the topology of the network is fixed. In practice, hosts, gateways and lines often fail and come back up. Since only the best route to any given destination is remembered by any given host or gateway, the gateway needs to be notified that its current best route has gone down. if the gateway involved in that route should crash, or the network connection to it break, then it has no way of notifying neighbours of the change.

In order to handle problems of this kind, distance vector protocols must make some provision for timing out routes. The details depend upon the specific protocol. As an example, in RIP every gateway that participates in routing sends an update message to all its neighbours once every 30 seconds. Suppose the current route for network N uses gateway G. If we don't hear from G for 180 seconds, we can assume that either the gateway has crashed or the network connecting us to it has become unusable. Thus, we mark the route as invalid. When we hear from another neighbour that has a valid route to N, the valid route will replace the invalid one. Note that we wait for 180 seconds before timing out a route even though we expect to hear from each neighbour by way of a router update message every 30 seconds. Unfortunately, messages are occasionally lost by networks. Thus, RIP does not invalidate a route based on a single missed update message.

Another popular IGP is Open Shortest Path First (OSPF) protocol (defined in the Internet Engineering Task Force (IETF)'s request for comments (rfc) 2328 [1]). Unlike RIP, OSPF is a link state routing protocol in which each router has knowledge of the whole network and uses this knowledge to calculate a routing table (using an algorithm known as the Djikstra algorithm [2]). It has less overhead than RIP because it only transmits messages when there has been a change in a router's information about the network, however these messages (known as Link State Updates (LSU's) each of which contains one or more Link State Advertisements (LSA's)) may contain much more information than is transmitted in each RIP rbuting-update message.

In addition to sending LSA's whenever there is a change in the network topology (e.g. because a link or a router has gone down) each host also periodically sends out a small "Hello" message which principally acts as a "keep alive" type message but also includes a small amount of network information. In the event that a router falls to receive a Hello message from a neighbouring router within a predetermined period known as the Router Dead Interval (RDI) (which may vary from one interface to another, although for a common network it is supposed to be the same for all links on that network according to the OSPF specification defined in (1)) the router will consider that the neighbouring router (or the link thereto) has gone down and it will adjust it's internal topology "map" accordingly and presently then send out a Link State Update to its other neighbours detailing the change.

In typical implementations of the OSPF protocol, the Hello Interval is set to a default value of 10 seconds and the Router Dead Interval is typically set to a value of 40 seconds, or four times the Hello Interval. Once a dead router is detected by a neighbouring router (which, in normal circumstances will therefore be at least after the elapse of the Router Dead Interval) the router generates a new LSA to reflect the changed topology. If a router (as opposed to just a link to that router) has gone down, all routers affected by the dead router must calculate their own LSA's and all of these are flooded throughout the network, and cause all of the routers in the network to redo the shortest path first calculation and then accordingly update (if necessary) their internal link-state database and their "topology map" and thus, if necessary, update their next hop information contained in their routing table.

Thus the time required to recover from a router failure consists of: (1) the failure detection time, (2) the LSA flooding time and (3) the time to complete the new SPF calculations and update the various topology and routing tables accordingly. As mentioned above, the failure detection time will typically take at least 40 seconds with a RDI of 40 seconds, the LSA flooding times consist of the propagation delays and any pacing delays resulting from the rate limiting of Link State Update packets sent down an interface.

Once a router receives an LSA, it schedules an SPF calculation. Since an SPF calculation using the Djikstra algorithm places a significant load on the router's processor, the router waits for some time (spfdelay time which is typically set at 5 seconds) to let other LSA's arrive before doing an SPF calculation (to avoid having to redo the calculation every time a new LSA arrives, given that LSA's are likely to arrive in groups as multiple different routers are affected by a single router going down—or coming back up). Moreover, the routers place a limit on the frequency with which SPF calculations may be performed (dictated by a variable spfHoldTime which is typically set to 10 seconds and which prevents a new spf calculation from being carried out at least until spfholdTime has elapsed since the last spf calculation). Both of these measures can introduce further delays in the time taken for a system to recover from a failure.

It has recently come to the attention of workers in this field that the time taken to recover from a network element failure in a typical implementation of an OSPF system is too long for modern requirements. This is because technology has evolved so that such networks may have very large bandwidths, and because of this a large amount of data could be lost whilst the network is in an unstable situation because it is in the process of recovering from a network element failure. A number of published documents have considered this issue and some of the most interesting of these are identified and briefly discussed below.

Alaettinoglu et al. [3] proposes reducing the HelloInterval to a millisecond range to achieve sub-second recovery from network failures, but this document does not consider any side effects of HelloInterval reduction. Since their processor model of a router assumes that data packets are forwarded by line cards in hardware and control packets are handled by the routing control processor, there is enough computation resource in the routing control processor to deal with the huge number of Hello messages. Thus they set the minimum possible value for HelloInterval without causing too many route flaps. These assumptions however are not always valid in practical network implementations.

Shaikh et al. [4] describes the use of Markov Chain based analysis of a simple network topology to obtain the expected times before high packet drop rates cause a healthy adjacency to be declared down and then back up again. The described simulation suggests that OSPF's behaviour depends only on the traffic overload factor and is insensitive to the packet size distribution, the buffer size or the packet dropping policy in effect. The paper suggests prioritising OSPF control traffic over normal data traffic in order to minimise the risk of healthy adjacencies being falsely declared as down due to congestion.

Basu and Riecke [5] study three indicators of OSPF routing stability: network convergence time, routing load on processor and the number of route flaps. They also investigate the scheme of using sub-second HelloIntervals to achieve faster recovery from network failures and conclude that 275 ms would be an optimal value for HelloInterval providing fast failure detection while not resulting in too many false alarms. The paper suggests introducing randomization into the "LSA timers" to avoid all routers issuing LSA's at the same time, causing congestion. However, the paper does not specify exactly how this could be achieved practically nor exactly what "LSA timers" they are talking about, or in what way the randomization should be introduced. Furthermore, this work still assumes that the control and data planes are physically separated.

Choudhury et al. [6] observes that reducing the HelloInterval lowers the threshold (in terms of number of LSAs) at which an LSA burst will lead to generation of false alarms. This paper also proposes explicitly marking certain key OSPF packets and arranging for the processing of these to be prioritised over both ordinary packets and other, less key, OSPF packets, especially where there is congestion [6].

IETF's rfc 4222 proposes considering the receipt of any OSPF packet (e.g. an LSA) from a neighbour as an indication of the good health of the router's adjacency with the neighbour [7]. This provision can help avoid false loss of adjacency in the scenarios where Hello packets get dropped because of congestion which caused by a large LSA burst, on the control link between two routers. Such mechanisms should help mitigate the false alarm problem significantly. However, in many practical OSPF networks there is no dedicated control link between routers and therefore LSA bursts are not the only causes of congestion which might cause Hello packets to be dropped. Many different types of control traffic for routing, signalling and network management as well as data traffic from customers contribute to network congestion, and the solution proposed in this paper will be less than completely successful in such circumstances.

More recently, Goyal, et al. [8] evaluate the best value for the HelloInterval that will lead to fast failure detection in the network while keeping the false alarm occurrence within acceptable limits and investigate the impact of both network congestion and the network topology on the optimal HelloInterval value. Additionally, they discuss the effectiveness of faster failure detection in achieving faster failure recovery in OSPF networks. Their work is similar to [5] in that it considers the tradeoff between faster failure detection and the increased frequency of false alarms. Unfortunately, this method relies heavily on the number of false alarms and this is only obtained from a network simulation tool. In a practical network, generally, a router can never know the number of local false alarms.

SUMMARY OF THE INVENTION

In summary, an embodiment of the present invention provides a dynamic routing protocol for use with a layer three inter-networking protocol (such as Internet Protocol (IP)) which dynamically varies the amount of time which a router waits before deciding that a neighbouring router (or the connection thereto) has gone down. The factors considered when setting this time may include the level of congestion suffered by the neighbouring router in question and/or the normal rate at which the neighbouring router in question has been sending/forwarding on data prior to a perceived interruption in the sending of data. The invention may be realised by modifying an existing layer 3 dynamic routing protocol such as Open Shortest Path First (OSPF).

According to a first aspect of the present invention, there is provided a method of operating a data network of the type in which a number of router devices forward received packets of data toward a destination node using the Internet Protocol wherein each router maintains a routing table, indicating the next hop to choose in respect of different ultimate destinations, in accordance with a routing protocol wherein neighbouring routers periodically communicate with one another and wherein these communications provide confirmation that they are still able to communicate with one another and wherein each router compares the time since it last received a communication of this type from each of its neighbours with a router dead interval and determines that the respective neighbouring router, or the currently designated route thereto, is no longer operating correctly in the event that the comparison indicates that the router dead interval has elapsed without such a communication having been received from the respective router, the method being characterized in that the router dead interval is dynamically varied in accordance with one or more properties of the network as measured by each respective router.

In this context, the term router dead interval is used in a general way to indicate any variable which stores a value indicative of an amount of time required to elapse without hearing from a neighbouring router before it is assumed that the neighbouring router or a connection thereto has died. In OSPF this equates to the "RouterDeadInterval" referred to in that protocol. However, the present invention is not intended to be limited to use with OSPF but applies to other routing protocols (though most preferably to other link state routing protocols). For example, it applied to RIP the router dead interval would correspond to the Timeout value for a particular route. Furthermore, if applied to BGP it would correspond to the "hold timer" value.

The term network or data network is used in slightly different senses in different parts of this application. It is sometimes used to refer to a network across which any one node may directly communicate with any other node using a link layer protocol (the term link layer includes the Medium Access Control sub-layer) such as Ethernet or ATM, etc. It should be clear from the context when it is being used in this sense. In the context of the appended claims and the statements of invention however, the term data network is employed in a more general sense to mean any collection of devices connected together in such a way that they may communicate with one another whether they have to use Internet Protocol in order to traverse separate underlying networks or not (i.e. the term is used to include internetworks as well as simple networks).

A separate router dead interval is preferably maintained and dynamically varied at each router in respect of every neighbouring router with which it is currently in communication. For example, consider a simple network having three routers A, B and C, each of which is connected to both of the other routers via separate interfaces onto separate networks such that there are three separate networks connecting the three routers together. Each router maintains two router dead intervals. For example router A maintains a Router Dead Interval $RDI_{AB}$ in respect of router B and a Router Dead Interval $RODI_{AC}$ in respect of router C.

Preferably the measurements made by a router to determine how long its router dead interval should be for a particular neighbouring router are ones which indicate the level of congestion being suffered by the neighbouring router. The general principle is then to maintain the router dead interval quite long (e.g. tens of seconds in length) when the measurements indicate that the neighbouring router is congested, whilst maintaining the interval relatively short (e.g. of a few seconds in length only) when the measurements indicate that the neighbouring router is not congested.

Since congestion can be a reason for a router effectively "going down" (i.e. ceasing to operate correctly), in a preferred embodiment, each router has a possibility of setting a very short or zero router dead interval in respect of a neighbouring router deemed to be heavily congested (instead of setting a long router dead interval) such that the router quickly declares its heavily congested neighbouring router to be down, thus easing its (i.e. the congested neighbours') workload to some extent and thus helping it to recover sooner than might otherwise have been the case. Preferably this possibility is determined using a pseudo random function where the probability of adopting this possible action depends to some extent on the estimated level of congestion.

Preferably, one method of estimating a neighbouring router's congestion is to have routers send modified Hello messages (Hello messages are short "keep alive" type messages) in which the percentage utilisation of the router's processor (the Central Processing Unit, CPU) is included. In a modification to the Open Shortest Path First protocol described in the IETFs RFC 2328, this could be done by reducing the size of the HelloInterval field from 16 bits to 8 bits and using these remaining 8 bits as a new 8 bit field to specify a percentage (in fact only 7 bits are required to specify any number from 0 to 128, so the most significant bit could be used for some other purpose, as could combinations representing numbers greater than 100, etc.). Alternatively, instead of modifying the HelloInterval field, the RouterDeadInterval field could be reduced from 32 bits to 24 bits and the liberated eight bits can form the new CPU percentage utilisation field, etc.

A few further changes to the OSPF protocol may be applied to enable an embodiment of the present invention to be most easily implemented. For example according to RFC 2328 (see section 10.5) if the RouterDeadInterval of a received Hello message does not match the RouterDeadInterval associated with the receiving interface of the receiving router then the message should be dropped without further processing. In an embodiment of the present invention based on OSPF, naturally this behaviour must be changed so that such messages are processed normally rather than being dropped. Other similar changes may be necessary as will be apparent to a person skilled in the art of IP routing protocols. A router may indicate that it is able to operate in accordance with a modified version of the OSPF protocol implementing the present invention by suitable amendment of one or some of the options flags in the options field contained in each OSPF packet header where appropriate (e.g. when sending a modified Hello packet).

In most conventional routing protocols such as OSPF, only messages transmitted between one router and another which are part of the particular protocol are relied upon as an indication that the transmitting router is still up and running. For example, in OSPF, only if a Hello message is received prior to expiry of the DeadRouterInterval will a particular router be considered as being up and running. According to a preferred embodiment of the present invention, however, any message or packet of data forwarded over a direct link from a neighbouring router is considered as an indication that the respective router is still up and running. In some situations simply knowing the interface over which the packevmessage is received will be sufficient to identify the link over which the message has arrived and thus the neighbouring router from which it has arrived. On broadcast and other networks where a single interface may be used to communicate with a number of different neighbouring router devices, it may be necessary to include a link layer function which identifies the IP address of the sending (i.e. forwarding) neighbouring router and to provide this information to the IP function so that it may ascertain which neighbouring router forwarded the packet in the case of a packet which originated from a device other than the neighbouring router, since in such a case the IP packet may not contain this information though the underlying link layer packet generally will contain this information.

According to a second aspect of the present invention, there is provided an Internet Protocol router device for use in a data network comprising a plurality of nodes, wherein packets of data are sent from one node in the network to another on a hop by hop basis, the router including:

an electronic data store for storing a routing table indicating the next hop destination for a received packet on the basis of the ultimate destination specified by the received packet;

a digital processor operable to maintain the routing table on the basis of communications received from neighbouring router devices within the network; and a timer for timing the length of time elapsed since last receiving a communication, or one of a subset of the possible types of communication, from each of one or more of the router device's neighbours; wherein the data store is further operable to store in respect of each of said one or more of the router device's neighbours a router dead interval; and the digital processor is further operable to compare said length of time elapsed with the corresponding router dead interval in respect of each of said one or more of the router device's neighbours and to ascertain that the corresponding router device is no longer operating correctly if the comparison indicates that a length of time equal to or greater than the router dead interval has elapsed without receiving a said communication, or one of a subset of the possible types of communication, from said neighbouring router device; the router device being characterised in that the digital processor is further operable to dynamically vary the or each router dead interval in accordance with one or more properties of the network.

According to further aspects of the present invention, there is provided a computer program or suite of computer programs for carrying out the method of the first aspect of the present invention during execution and a carrier medium carrying such a program or suite of programs. Examples of possible carrier mediums in this context include magnetic and optical storage disks and carrier signals modulated in such a way as to carry the corresponding information (e.g. for broadcast or transmission over a wireless interface or across a data network generally, etc.).

BRIEF DESCRIPTION OF DRAWINGS

In order that the present invention may be better understood, embodiments thereof will now be described, by way of example only, with reference to the accompanying drawings in which:

FIG. 4 is a table illustrating the structure of a modified Hello message for use in the method of operating the routers of FIG. 1 in accordance with a second embodiment of the present invention;

FIGS. 8a and 8b are timing charts showing the occurrence of certain significant events during example operations of the methods of FIGS. 5 to 7.

DETAILED DESCRIPTION OF THE INVENTION

Figure 1:
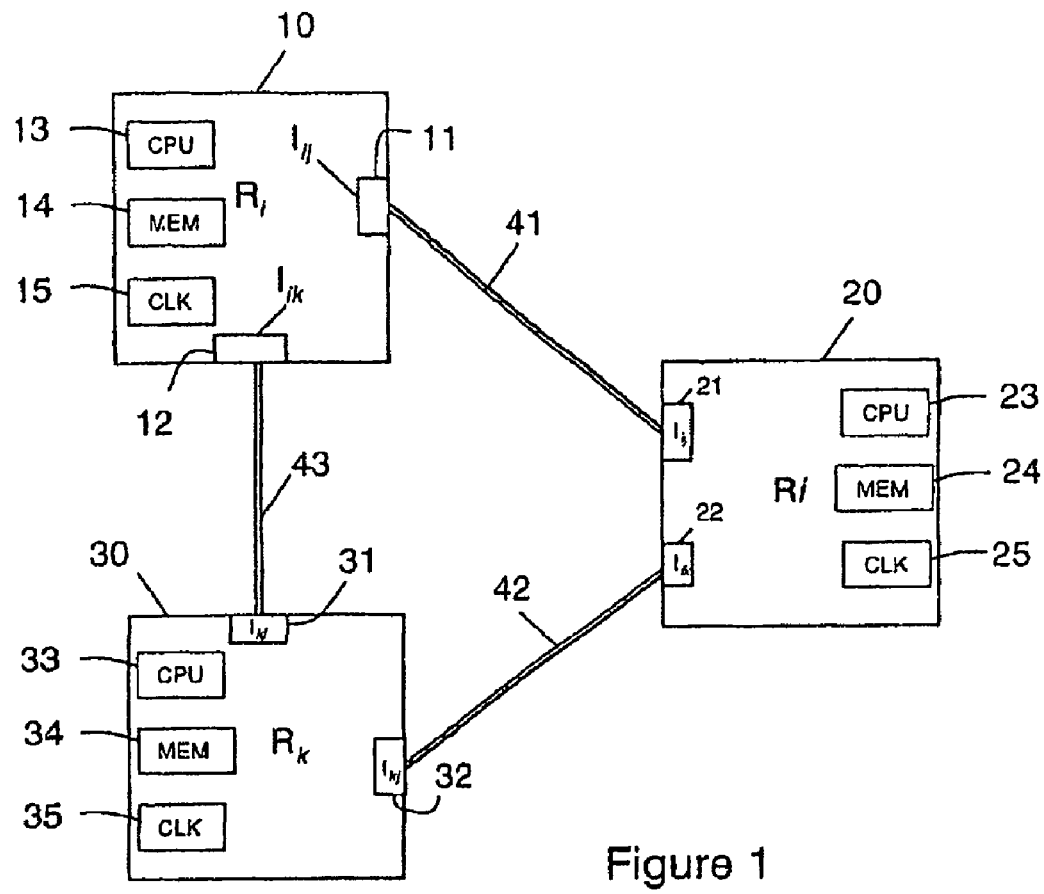
FIG. 1 is a schematic illustration of three router devices connected together in a data internetwork which is suitable for implementing an embodiment of the present invention.

Two principal embodiments of the present invention will now be described. Both of these embodiments relate to a data network comprising a number of Internet Protocol (IP) routers, which operate according to a modified version of the Open Shortest Path First (OSPF) routing protocol in order to maintain their IP routing tables. FIG. 1 illustrates three IP routers $R_i$ 10, $R_j$ 20 and $R_k$ 30 connected together over three networks 41, 42, 43 (network 41 being common to routers 10 and 20, network 42 being common to routers 20 and 30 and network 43 being common to routers 10 and 30). Note that the networks 41, 42, 43 are simply behaving as means for carrying messages and IP traffic between the respective routers, for the purposes of the present description, and could be formed by a point-to-point connection over, say, a private circuit serial line with modems located at the respective routers' interfaces, as well as any sort of network such as an Ethernet Local Area Network (LAN) or an X.25 Public Data Network (PDN) etc. Each router has separate interfaces 11, 12, 21, 22, 31, 32 to the networks connecting the two other routers respectively. Thus router $R_i$ has interfaces $I_{ij}$ and $I_{ik}$ connecting router $R_i$ to routers $R_j$ and $R_k$ via networks 41 and 43 respectively. Similarly, routers $R_j$ and $R_k$ have interfaces $I_{jl}$ and $I_{jk}$ and $I_{kl}$ and $I_{kj}$ respectively. The underlying protocols and physical media by which IP packets are transmitted over the networks from an interface of one router to an interface of another router are largely irrelevant for the purposes of the present invention and will not therefore be discussed further. Each router additionally includes a central processing unit 13, 23, 33; a memory 14, 24, 34 and a clock or timer unit 15, 25, 35 (which may be formed integrally with the central processing unit).

Figure 2:
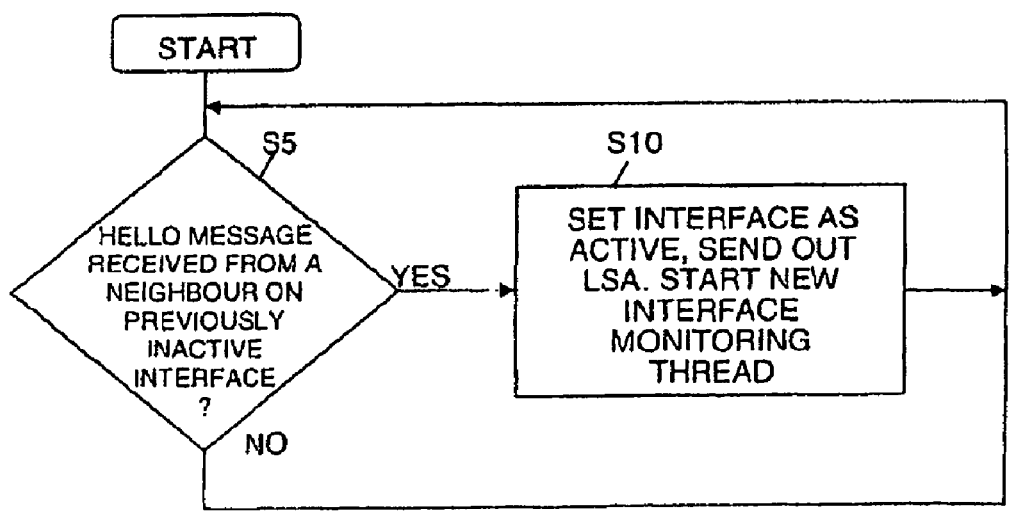
FIG. 2 is a flow chart showing the steps performed when a Hello message is received on an interface of one of the routers in FIG. 1 from another one of the routers which had been believed to be down prior to receipt of the Hello message.

FIG. 2 schematically illustrates the behaviour of a router before it has established communication with a neighbouring router contactable via a particular interface (in as much as it is pertinent to the understanding of the present invention). Basically, the router waits (Step S5) to receive a Hello message from a neighbouring router over the interface and as soon as it does receive such a Hello message it performs some processing including (at step S10) setting the interface to the neighbourlng router as active and marking the neighbouring router as alive and active for onward routing of IP packets. An appropriate Link State Advertisement (LSA) is generated and transmitted to all neighbouring routers by way of a Link State Update (LSU) message. Furthermore, a new Interface Monitoring Thread is initiated. Two different types of Interface monitoring thread are described below as first and second embodiments.

FIRST EMBODIMENT

Figure 3:
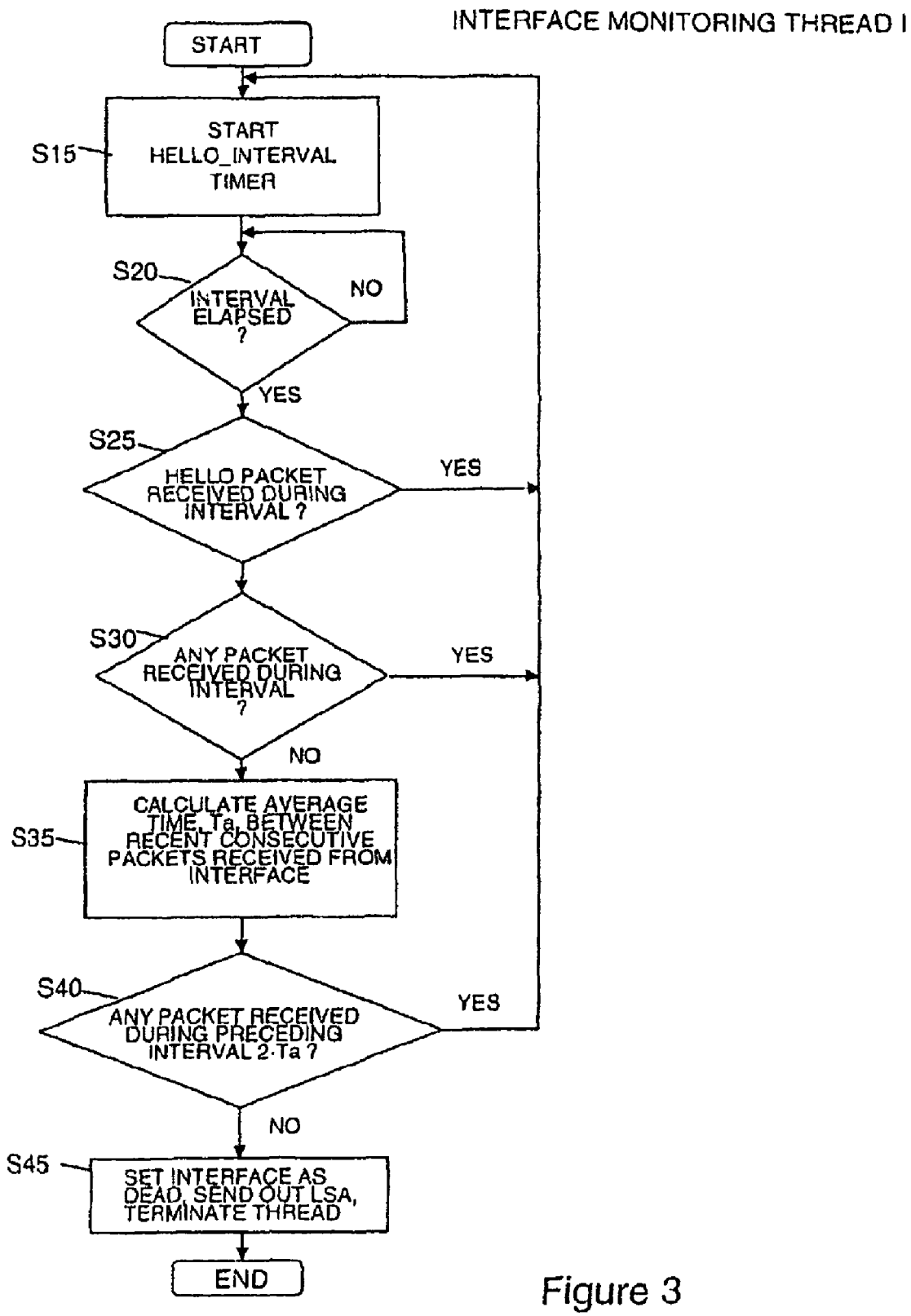
FIG. 3 is a flow chart illustrating the method performed by an Interface Monitoring Thread running on one of the routers of FIG. 1 according to a first embodiment of the present invention.

FIG. 3 schematically illustrates the steps performed by an interface monitoring thread operating according to a first embodiment of the present invention. The purpose of the thread is to monitor its respective interface in order to attempt to ascertain as soon as possible that the neighbouring router at the other end of the interface has gone down. In the standard OSPF protocol, this is done by maintaining a static RDI and declaring that a particular router has gone down whenever it fails to receive a Hello message from the router over an interval exceeding the RDI. The interface monitoring thread of FIG. 3, however, can react more quickly than this is in certain circumstances which are likely to arise when a router has gone down rather than as a result of Hello messages going astray or failing to be generated because of the router in question becoming congested.

Thus the method commences at step S15 by starting a Hello-Interval Timer. The Hello-Interval is determined by the Hello-interval used by the monitored router for setting the frequency with which it sends out Hello Messages to the monitoring router. This duration is specified in each Hello message which the monitored router sends to the monitoring router.

Step S20 waits for the Hello-Interval Timer to indicate that the Hello-Interval has elapsed and then the method proceeds to step S25.

Step S25 checks to see if a Hello message has been received on the monitored interface from the monitored Router during the preceding Hello-interval. If so, there is no question of the monitored router having gone down and the method loops back to step S15 and the Hello-interval Timer is restarted.

If no Hello message from the monitored router has been received over the monitored interface, then the method proceeds to step S30 in which it is checked to see if any packet has been received over the monitored interface (e.g. a normal data packet, etc.). If such a packet has been received, then the monitoring router assumes that the monitored router is still alive and well, but that its most recent Hello message has just gone astray somewhere/somehow and the method loops back to Step S15 to restart the Hello-Interval Timer as before.

If no messages of any sort have been received over the monitored interface from the monitored router, then the method proceeds to step S35, in which an average time, $T_a$, between messages from the monitored router over the monitored interface is calculated in respect of the last n received messages (where n is typically a small number such as 3 or 4). This can be done by dividing the interval between the time of arrival of the most recent message and the time of arrival of the $n^{th}$ preceding message by n. The method then proceeds to step S40.

In Step S40, it is determined whether any message has been received during the preceding interval of duration $2*T_a$ (i.e. twice the average interval between received messages for the preceding n received messages). If a message of some sort has been received during this interval, then the method loops back to step S15 and the Hello-Interval Timer is restarted. If no such message has been received in this time, then the method proceeds to Step S45.

In step S45 the monitored interface and router are declared as being dead. A Link State Advertisement to this effect is generated and sent out after a short delay by way of a Link State Update (generation of the LSA and the corresponding LSU is not done within the interface monitoring thread itself, but in a separate thread handling LSA and LSU generation and processing). Having done this, the Thread is terminated and the method correspondingly ends.

SECOND EMBODIMENT

FIG. 4 schematically illustrates the structure of a modified Hello message for use in the second embodiment of the present invention. As in standard OSPF, each Hello message consists of a number of different byte fields conveniently grouped in groups of four bytes shown in separate rows (i.e. 32 bits) for ease of presentation. As shown in FIG. 4, the first row is the standard OSPF Header with header type=1 (this indicates that it is a Hello Message). In fact the standard OSPF header actually has 24 bytes, and would occupy 6 rows therefore if written out in full. After the header the next field is the Network Mask which is 32 bits long and which is specific to the network (or subnet) over which the message has been sent (and should correspond to that stored by the monitoring router in respect of the monitored interface). For example, if the interface is to a class B network whose third byte is used for subnetting, the network mask would be 0xffffff00.

The next field is the Hello Interval field. Conventionally, this field is 16 bits long and is used to store a number between zero and 65,535 which represents the number of seconds which the sending router will wait between sending out Hello packets over the interface. However, in the present embodiment, this field is split into two fields each of 8 bits long. The first field is used to store the Hello Interval, again expressed in seconds. The shorter field is only able to store numbers between zero and 255, but this is ample as the Hello Interval is normally set at a maximum of about 10 seconds. The second 8-bit field (in the place formally occupied by the 16-bit Hello Interval field) is used to store another number between zero and 255 which represents the percentage utilisation of the CPU of the sending router device. (Thus in fact only numbers between 0 and 100 are valid—this can be achieved using only 7 of the 8 bits available, so the $8^{th}$ bit could be used for an alternative purpose.)

The remaining fields are entirely conventional. They comprise:

OPTIONS—an 8-bit options field which is used to specify the optional capabilities supported by the router, as documented in Section A.2 of RFC 2328. (Note however that an unused flag within the options field could be used to indicate to a receiving router that the Hello message is a modified Hello message including a percentage utilisation of the CPU as set out above.)

ROUTER PRIORITY—an 8-bit field which specifies this router's Router Priority; this is used in (Backup) Designated Router election. It set to 0, the router will be ineligible to become (Backup) Designated Router. Generally, the higher the priority as specified in this field, the more likely it is that the router will be elected as a designated router (or a backup designated router).

ROUTER DEAD INTERVAL—this is a 32 bit field used to store a number between 0 and 4,294,967,295 which represents the number of seconds that the router will wait for after receiving a Hello packet from any neighbouring router, until it deems the neighbour router, from which no Hello packet has been received for the Router dead interval, or the interface to the router, to be down. It is normally set at approximately 4 times the Hello Interval, so it is clear that using 32 bits for this field is quite excessive (the maximum number represents over 136 years) and it would be very feasible to split this field up into a number of smaller fields as well as or instead of splitting up the Hello Interval, in alternative embodiments.

DESIGNATED ROUTER—this is a 32 bit field which stores the IP address of the router specified as the designated router, in the view of the sending router. The Designated Router is identified here by its IP interface address on the network. It is set to 0.0.0.0 if there is no Designated Router in the view of the sending router.

BACKUP DESIGNATED ROUTER—this is a 32 bit field which stores the IP address of the router specified as the backup designated router, in the view of the sending router. The Backup Designated Router is identified here by its IP interface address on the network. It is set to 0.0.0.0 if there is no Backup Designated Router in the view of the sending router.

NEIGHBOUR—Finally, there follows a series of 32-bit fields each of which stores the respective IP address of each router from whom valid Hello packets have been seen recently on the network, where recently means within the last Router Dead Interval seconds.

Figure 5:
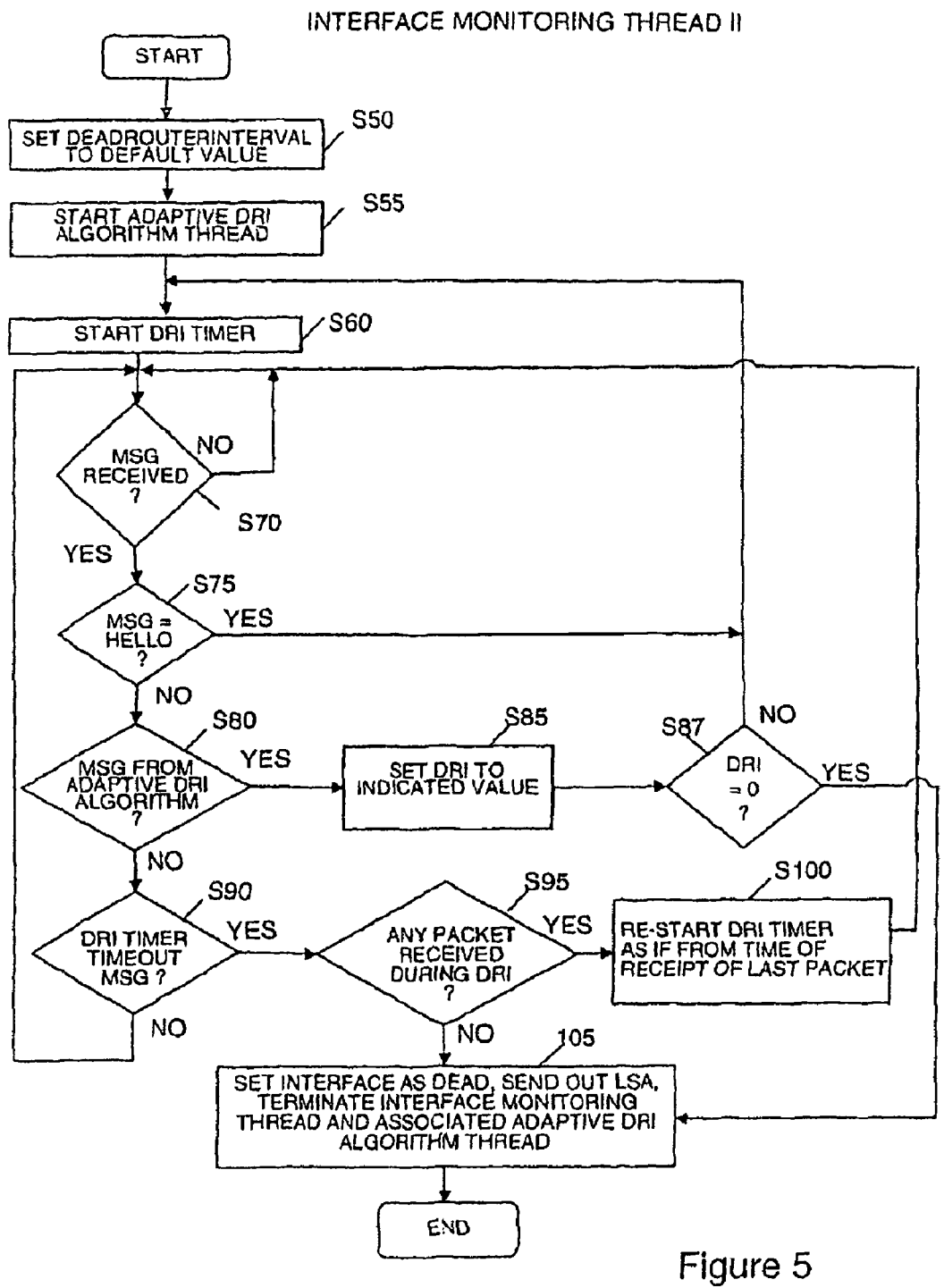
FIG. 5 is a flow chart illustrating the method performed by an Interface Monitoring Thread running on one of the routers of FIG. 1 according to a second embodiment of the present invention.

Referring now to FIG. 5, in this embodiment, a more sophisticated interface monitoring thread is used whose steps are illustrated schematically in FIG. 5. Note that in the arrangement illustrated schematically in FIG. 1, there is only a single neighbouring router associated with each interface, and therefore there is only ever a single interface monitoring thread at most for each interface—however; in network arrangements in which a single interface to a network is used to communicate with more than one neighbouring router, a separate interface monitoring thread is set up for each neighbouring router contactable over the interface (provided each such neighbouring router is up and running on that network and available over the interface). This sort of situation is discussed in greater detail below, together with a further discussion about interfaces in general.

When a new interface monitoring thread is initiated (e.g. at step S10 in the method described above with reference to FIG. 2) the method commences at step S50 by setting a variable, ROUTER DEAD INTERVAL to a default value (which in the present embodiment is set to be equal to 4 times the Hello Interval, which in turn is set by default to be 5 seconds in the present embodiment). The method then proceeds to step S55 in which a separate thread is initiated (an Adaptive RDI thread) to perform an algorithm to adaptively modify the Router Dead Interval—the steps carried out by this thread are described below with reference to FIG. 6.

The method then proceeds to step S60 in which a Router Dead Interval (RDI) timer is, commenced. This timer generates a Router Dead Interval (RDI) time out message upon elapse of the RDI from the lime of commencement of the timer unless it has been re-started in the meantime.

The method then proceeds to step S70 where the thread waits for a message to be received. Three types of messages may be received by this thread: a Hello message from a neighbouring router, a message from the associated adaptive RDI algorithm thread Initiated in step S55, and/or a RDI timeout message.

At step S75 the method checks to see if a Hello message has been received from the respective neighbouring router associated with the current instance of the interface monitoring thread. If so, the method loops back to step S60 and the RDI timer is re-started. Otherwise, the method proceeds to step S80.

In step S80 the method checks whether the received message is a message from the Adaptive RDI Algorithm thread. If so, it will include a new value for the RDI. The method therefore proceeds to step S85 in which the DRI is reset to the new value indicated in the message. The method then proceeds to step S87 where it checks if the new value for the RDI is equal to 0 seconds. If so, the method jumps to step S105 which is described below. If the new RDI value is not equal to zero the method loops back S60 where the RDI timer is restarted (with the new value for RDI).

If in step S80 it is determined that the received message is not from the Adaptive RDI algorithm, the method proceeds to step S90 where it is checked that the received message is an RDI timeout message (note this should be the only remaining option after eliminating a Hello message and a message from the Adaptive RDI thread in step S75 and S80 so if the message is not an RDI timeout message there has probably been some sort of error and this should be caught and handled in an appropriate manner, but such error handling is beyond the scope of the present invention and for present purposes it will simply be assumed that this cannot happen—for this reason there is no "no" branch shown from the decision box of step S90). If it is an RDI timeout message, the method proceeds to step S95 where it is determined if any packet (e.g. a normal data packet or a signalling packet, etc.) has been received from the monitored router during the Router Dead Interval (i.e. since the RDI timer was last re-started). If any packet has been received during this interval from the monitored router, then the method proceeds to step S100 in which the RDI timer is restarted as if from the time of receipt of the most recently received packet coming from the monitored router. In the present example, there is only a single neighbouring router (and no other host devices) associated with each interface and thus this is equivalent to the time of receipt of the most recently received packet over the monitored interface. Upon completion of step S100 the method loops back to step S70 to await receipt of a further message. Other arrangements are discussed below. If at step S95 it is determined that no packet of any sort has been received from the monitored router over the monitored interface since the RDI timer was last re-started, then the method proceeds to step S105.

In step S105 (which may be reached either by a positive determination from step S87 or by a negative determination from step S95) the direct route over the monitored interface to the monitored router is declared as dead. A corresponding Link State Advertisement (LSA) is generated and flooded to the router's other neighbours by way of a Link State Update (LSU). Finally, both the current thread and the corresponding Adaptive RDI algorithm thread are terminated. Thus, upon completion of step S105, the thread terminates and the method therefore ends.

Figure 6A:
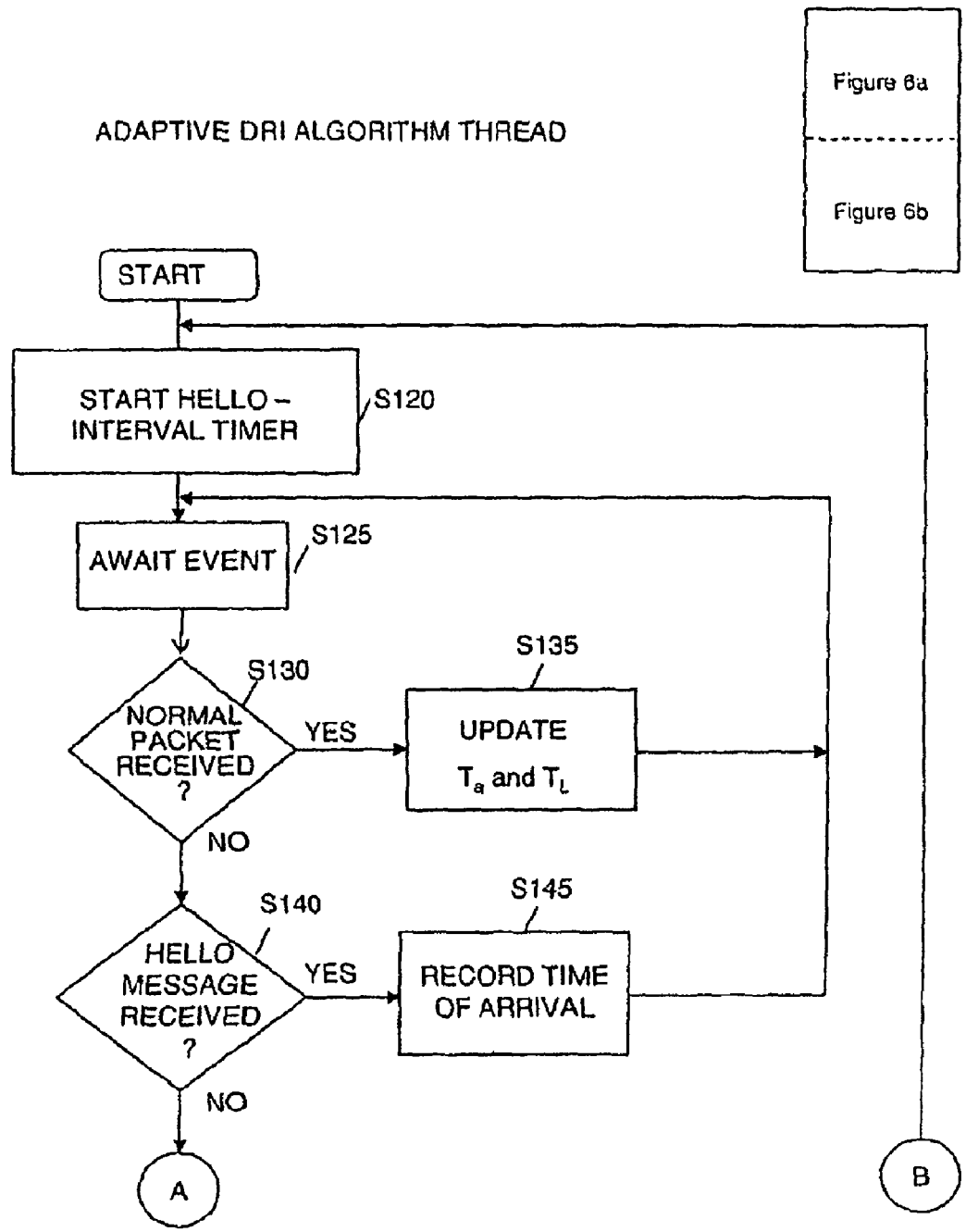
FIG. 6 is a flow chart illustrating the method performed by an Adaptive RDI Algorithm Thread running on the same router as the thread of FIG. 5 according to the second embodiment of the present invention.
Figure 6B:
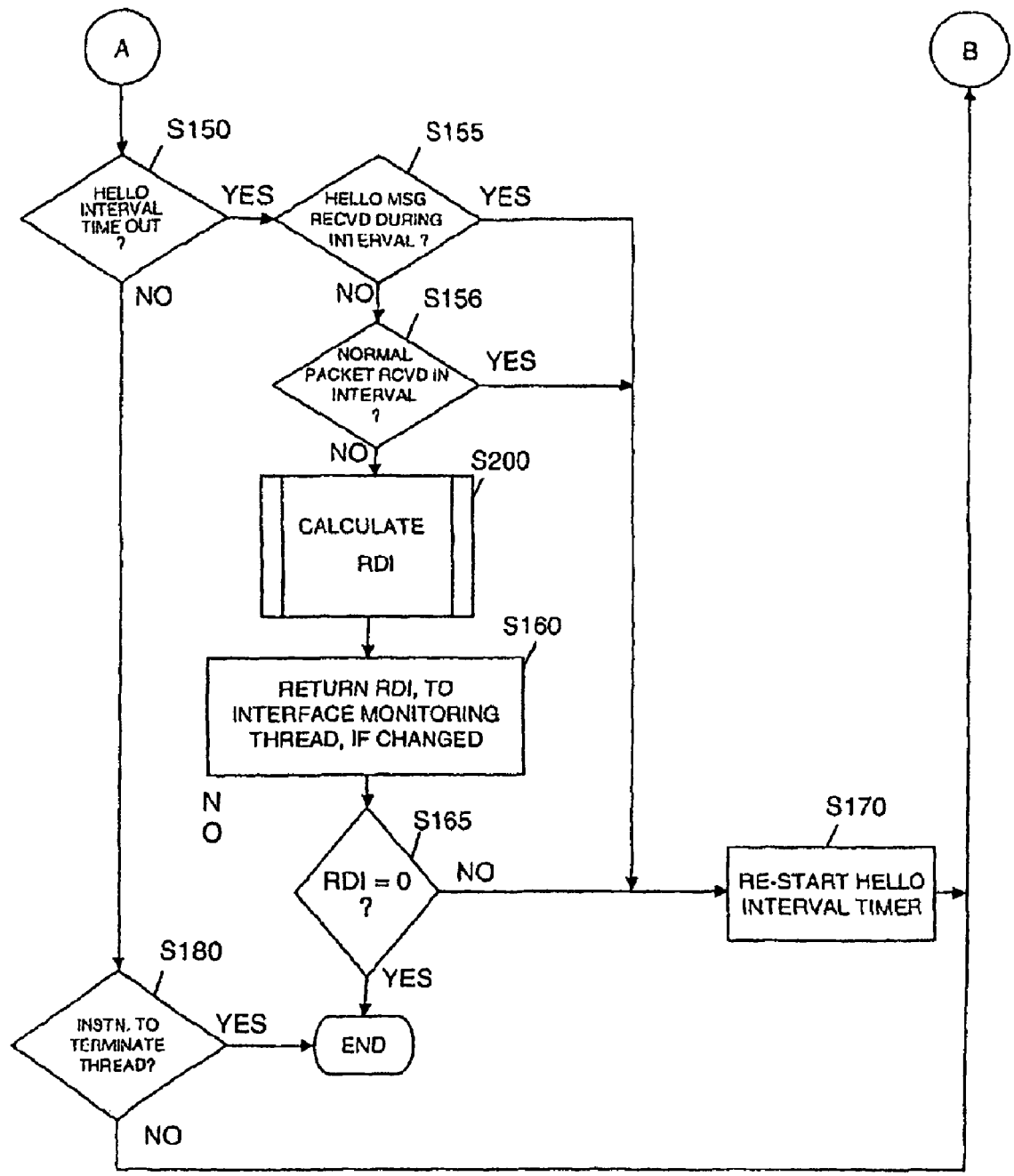

Referring now to FIG. 6, When an Adaptive RDI algorithm thread is initiated (e.g. at step S55 of FIG. 5), the method of this thread commences at step S120 in which a Hello-Interval timer is started—this will cause a Hello-Interval timeout message to be generated after expiry of the Hello-Interval period which, as mentioned above, is set in the present embodiment to equal 5 seconds.

The method then proceeds to step S125 in which the method waits for an event to occur—possible events are the receipt of a normal packet (from the monitored router over the monitored interface), the receipt of a Hello message (from the monitored router over the monitored interface), the receipt of a Hello-interval timeout message (from the Hello-Interval timer), or the receipt of a message from the associated interface monitoring thread (i.e. the one that initiated the current thread) instructing the current thread to terminate.

Once an event has occurred, the method proceeds to step S130 in which it is checked if a normal packet has been received (i.e. any packet other than a Hello Message from the monitored router over the monitored interface) from the monitored router over the monitored interface. If so, then the method proceeds to step S135 in which a variable $T_a$ is modified. The variable $T_a$ stares a number representative of a typical amount of time between received normal packets coming over the monitored interface from (that is to say, in the most part, via) the monitored router. In the present embodiment this is performed by noting the elapse of time between receipt of the most recent normal packet and the receipt of the $n^{th}$ most recent packet; in the present embodiment, n is 3, but this could be varied where there is ample storage space available, etc. In an alternative embodiment, $T_a$ is calculated by having an initial default value which could be say 1 second and updating this using a formula such as $T_a=0.9*T_a+0.1 T_a^{most\_recent}$ where $T_a^{most\_recent}$ is the time between receipt of the most recently received normal packet and receipt of the normal packet immediately preceding that; naturally 0.9 and 0.1 are just examples and could be replaced by other numbers of the form x and (1−x), where x is a number between 0 and 1. In addition to updating $T_a$, a variable $T_{LAST}$ is also updated; $T_{LAST}$ stores the time of arrival of the most recently received packet (either a normal packet or a Hello message) from the monitored router over the monitored interface. This variable is then used later (in subroutine S200) to calculate a value $T_L$ which represents the elapse of time from the present time to the time of receipt of the most recently received packet. Upon completion of step S135, the method loops back to step S125 where the method again awaits for an event to occur.

If at step S130 it is determined that a normal packet has not been received, then the method proceeds to step S140 where it is checked whether a Hello message (from the monitored router over the monitored interface) has been received, and if so the method proceeds to step S145 in which the time of arrival of the most recent Hello message is updated to reflect the current time. $T_{Last}$ is also updated at this time. The method then loops back to step S125 where the method again awaits for an event to occur.

If at step S140 it is determined that a Hello Message has not been received, then the method proceeds to step S150 where it is checked whether a Hello Interval Timeout has occurred. If so, the method proceeds to step S155 in which it is checked whether a Hello Message (from the monitored router over the monitored interface) has been received within the preceding Hello Interval, and if so the method proceeds to step S170 (described below). It at step S155 it is determined that no Hello Message has been received within the preceding Hello Interval, then, in the present embodiment, the method proceeds to step S156 where it is checked whether a normal packet has been received during the preceding Hello Interval. If so, then the method again jumps to step S170 (described below); otherwise (that is if no packet of any sort has been received during the preceding Hello Interval) the method proceeds to subroutine S200 in which a value for the Router Dead Interval (RDI) is calculated (see FIG. 7 and its description below).

Upon completion of Subroutine S200, the method proceeds to step S160 in which it is determined if the RDI has been modified from its previous value, and if it has, then the new value is passed by way of a message to the respective interface monitoring thread. Upon completion of step S160 the method proceeds to step S165 where it is checked if the new RDI value is set to zero. If so, the thread will gracefully terminate itself (since the router should now be declaring the respective neighbour router as dead and so there is no longer any need for this thread—if the neighbour comes back up again a new thread will be commenced). If the RDI is not zero, the method proceeds to step S170.

At step S170, the Hello Interval Timer is restarted and then the method loops back to step S125 where the method again awaits for an event to occur.

If at step S150, it is determined that the event which has been detected is not a Hello Interval Timeout event, then the method proceeds to step S180 where it is checked if the event is the receipt of an instruction to terminate issued by the respective interface monitoring thread. If so, then the thread simply terminates itself gracefully in the same sort of way as if it had just calculated a zero value for the RDI. It should not be possible for the method to detect that the event is not an instruction to terminate having got to this point in the method unless some sort of error has occurred; nonetheless if it detects that some other event has occurred. In the present embodiment, it is simply ignored and the method loops back to step S125 where the method again awaits for an (other) event to occur.

Figure 7:
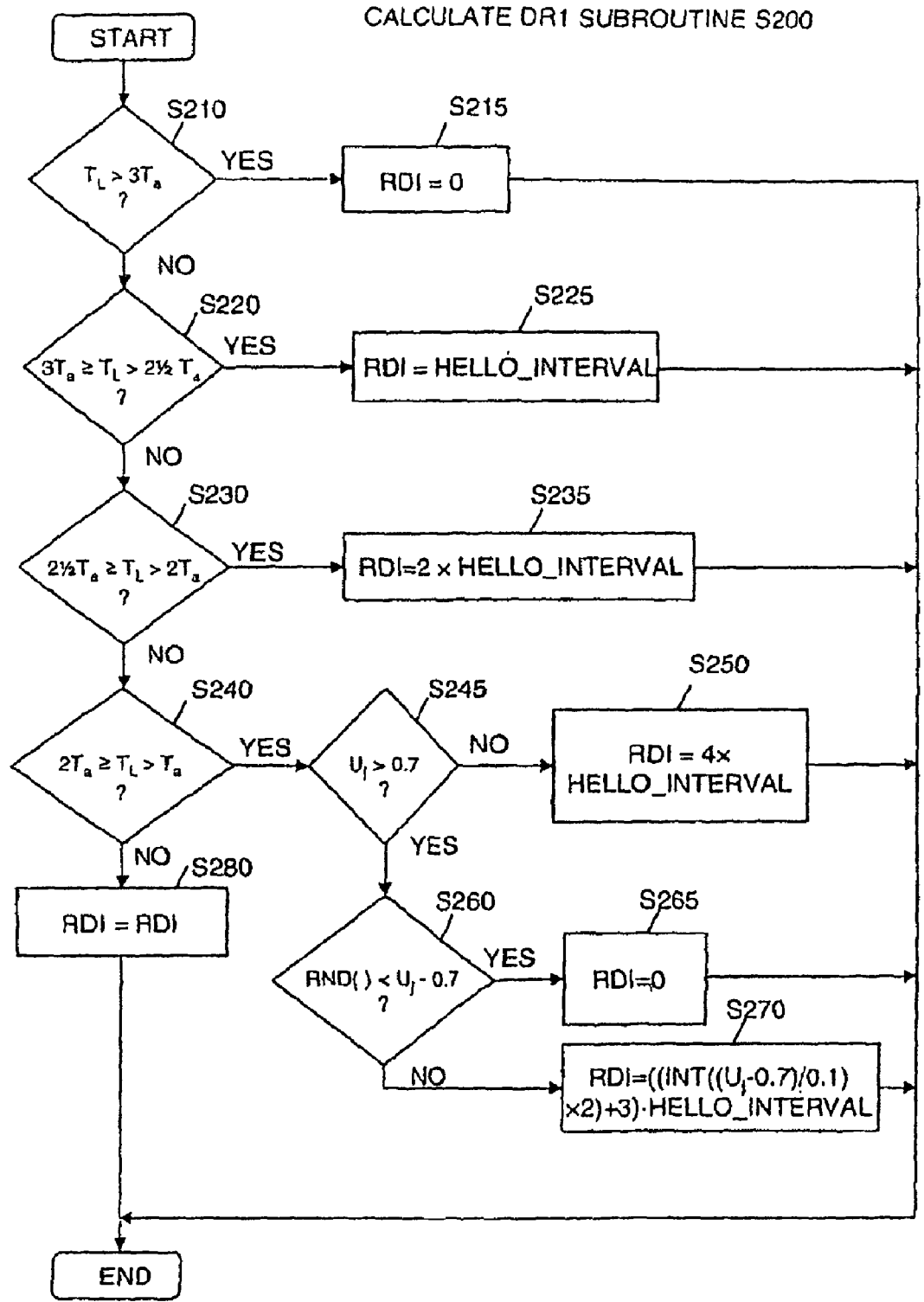
FIG. 7 is a flow chart illustrating the method performed by a Calculate RDI subroutine of the method of FIG. 6.

The RDI subroutine referred to above will now be described with reference to FIG. 7. Upon commencement of the subroutine, the method proceeds to step S210 where it is checked if $T_L$ is greater than $3*T_a$. Recall that $T_L$ is the time elapsed since any packet was received over the monitored interface from the monitored router. It can, for example, be calculated by getting the current time from the system clock and subtracting from this the value stored in $T_{LAST}$. If the determination is positive (i.e. that $T_L$ is greater than $3*T_a$) then the method proceeds to step S215 in which RDI is set to zero and then the subroutine ends.

If at step S210 it is determined that $T_L$ is less than or equal to $3*T_a$, then the method proceeds to step S220 where it is determined if $T_L$ lies between $2.5*T_a$ and $3*T_a$ ($3T_a \geq T_L > 2.5*T_a$). If so, RDI is set to equal the Hello Interval (step S225) which in the present embodiment is set to 5 seconds. If not, then the method proceeds to step S230.

At step S230, it is checked whether $T_L$ lies between $2*T_a$ and $2.5*T_a$ ($2.5*T_a \geq T_L > 2*T_a$). If so, RDI is set to equal twice the Hello Interval (step S235) which in the present embodiment equates to 10 seconds. If not, then the method proceeds to step S240.

At step S240, it is determined whether $T_L$ lies between $T_a$ and $2*T_a$ ($2*T_a \geq T_L > T_a$). If not the method proceeds to step S280 in which RDI is maintained at its current value and then the subroutine ends. Otherwise, the method proceeds to step S245 in which it is determined if the neighbouring routers CPU utilisation (Us) is greater than 70% (>0.7) according to the most recently received (modified) Hello message from the neighbouring router. If not, then RDI is set to four times the Hello Interval (i.e. to 20 seconds in the present embodiment) (step S250) and then the subroutine ends.

If at step S245 it is determined that the neighbouring routers CPU utilisation is greater than 70% (according to the most recently received Hello message from the neighbouring router) then the method proceeds to step S260 in which a pseudo random number between zero and one is generated and compared with the value $U_j$—0.7 (note since $U_j$ must be between 0.7 and 1, this difference will result in a number between 0 (for a CPU utilisation of 70%) and 0.3 (for a utilisation of 100%)). If the pseudo random number generated is less than this difference (and the probability of this will vary between 0% for a CPU utilisation of 70% and 30% for a utilisation of 100%) then the method proceeds to step S265 in which the RDI is set to zero and then the subroutine ends. The reason for doing this is so that occasionally heavily congested routers are declared as dead by one (or a few) of their neighbours. This causes traffic which would otherwise have been forwarded to them (and thus increasing their congestion) to be diverted away from such heavily congested routers.

If the comparison at step S260 determines that the pseudo random number generated is less than the difference between $U_j$ and 0.7 (and the probability of this will vary between 70% for a CPU utilisation of 100% and 100% for a utilisation of 70%) then the method proceeds to step S265 in which the RDI is set according to the following formula:

$$RDI=((INT((U_j-0.7)/0.1)*2)+3)*Hello\ Interval$$

Thus if $U_j$ is more than 0.7 but less than 0.8 then RDI Is set to $3*5=15$ seconds; if $U_j$ is more than or equal to 0.8 but less than 0.9 then RDI is set to $5*5=25$ seconds, etc. up to 45 seconds for values of $U_j$ between 0.9 and 1.0. The reason for operating in this way, is that the more heavily congested the neighbouring router is (i.e. the greater the value of $U_j$ the more likely it is that Hello messages are simply getting lost, rather than the router or the connection thereto actually being down, thus RDI is set to increasingly larger values depending on the value of $U_j$. The subroutine then ends after step S270.

FIGS. 8a and 8b are timing charts Illustrating how two different example situations of differing timings for receiving normal packets and Hello Messages over a monitored interface from a monitored router cause the methods to generate various different. RDI values until the monitored router is declared as dead.

Each of FIGS. 8a and 8b contains three timelines "moving" from left to right starting at an arbitrary-time "zero". The top line records the arrival of Hello Messages (single lines) and normal packets (hollow bars) over the monitored interface from the monitored router. The middle line records events taking place in the interface Monitoring Thread (IMT) (see FIG. 5), namely the restarting of the RDI timer (single lines), the processing performed (in step S105) to set a neighbouring router/interface as dead (short solid bar) and the termination of the thread (short parallel lines). The bottom line in each figure represents activities occurring in the Adaptive RDI Algorithm Thread (ARAT), namely the starting or restarting of the Hello Interval timer—possibly including a recalculation of the RDI—(single lines), transmitting of messages from the ARAT to the IMT indicating a changed value of the RDI (arrows pointing from the bottom line to the middle line), and the termination of the thread (short parallel lines).

Looking now at FIG. 8a, it can be seen from the top line that Hello Messages are received at times 0 s, 5 s, 10 s and 15 s and normal packets are received at times 2 s, 6 s and 14 s, with no subsequent messages or packets being received after these ones. Underneath the timelines, the values for $T_a$ and $T_L$ at various different times are shown; upon receipt of the normal packet at time 2 s, $T_a$ is recalculated and set to $T_a=2.5$ s, at time 6 s to $T_a=3.5$ s (note that these two values assume earlier normal packets have been received at times −3 s and −1 s) and at time 14 s to $T_a=6$ s ((14−2)/2); at times 21 s, 26 s, 31 s and 36 s $T_L$ (the time expired since any packet or message was last received over the monitored interface from the monitored router) takes the values 6 s, 11 s, 16 s and 21 s respectively. From the second timeline it can be seen that the ROI timer is restarted at times 0 s, 5 s, 10 s and 15 s (upon receipt of the corresponding Hello Messages indicated in the top line and positive determinations in step S75) and then again at time 31 s in response to a message from the Adaptive RDI algorithm thread indicating a modified RDI of 5 seconds (reduced from a previous—default—RDI of 20 seconds) and in response to a positive determination at step S80 and a negative determination at step S87. At time 36 s the interface monitoring thread receives another message from the Adaptive RDI Algorithm thread this time indicating a further changed RDI now of zero seconds, this results in positive determinations at both step S380 and step S87 which thus results in this thread performing step S105; after a short delay the thread ends (at a time of approx 41 s).

From the third timeline it can be seen that the Hello Interval timer in the adaptive RDI algorithm thread is restarted at times 1 s, 6 s, 11 s and 16 s in response to positive determinations at steps S150 and S155. At time 21 s, the Hello Timer restarted at time 16 s expires and this causes a positive determination at step S150, but negative determinations at steps S155 and S156 which cause the RDI to be recalculated in subroutine S200. Since at this time $T_a=6$ and $T_L=6$, a negative determination is made at step S240 and hence at step S280 RDI is maintained unchanged at 20 seconds, thus no message is sent to the interface monitoring thread (step S160) and a negative determination is made at step S165 causing the Hello timer to be restarted (step S170). At time 26 s, the Hello Interval timer restarted at time 21 s expires and this causes a positive determination at step S150, but negative determinations at steps S155 and S156 which cause the RDI to be recalculated in subroutine S200. Since at this time $T_a=6$ and $T_L=16$, a positive determination is made at step S240; it is assumed that $U_j$ in this example was indicated as being below 0.7 resulting in a positive determination at step S245 and hence at step S250 RDI is set to 4*Hello Interval which in turn results in the RDI being again maintained unchanged at 20 seconds, thus no message is sent to the interface monitoring thread (step S160) and a negative determination is made at step S165 causing the Hello timer to be restarted (step S170).

At time 31 s, the Hello Timer restarted at time 26 s expires and this causes a positive determination at step S150, but negative determinations at steps S155 and S156 which cause the RDI to be recalculated in subroutine S200. Since at this time $T_a=6$ and $T_L=16$; a positive determination is made at step S230 and hence at step S235 RDI is set to 2*Hello Interval causing it to be changed from 20 s to 10 s, thus a message is sent to the interface monitoring thread (step S160) and a negative determination is made at step S165 causing the Hello timer to be restarted (step S170).

At time 36 s, the Hello Interval timer restarted at time 31 s expires and this causes a positive determination at step S150, but negative determinations at steps S155 and S156 which cause the RDI to be recalculated in subroutine S200. Since at this time $T_a=6$ and $T_L=21$, a positive determination is made at step S210 and hence RDI is set to zero; this results in a change to RDI and hence a message is sent to the interface monitoring thread at this time informing it of the new value of RDI; furthermore, a positive determination is made at step S165 and thus the thread gracefully terminates itself (allowing approx 5 seconds before terminating to receive any further messages etc (although no action will be taken on any such received messages at this stage). As noted above, upon receipt of this message from the Adaptive RDI algorithm thread, the interface monitoring thread sets the neighbouring router/interface as dead and then gracefully terminates itself as well.

Referring now to FIG. 8b, it can be seen that in addition to receiving exactly the same normal packets and Hello messages as in FIG. 8a, two further normal packets are additionally received at times 9 s and 12 s, this results in a much lower value for $T_a=2.5$ at all times after time 14 s. This in turn means that at time 21 s, when the Hello timer restarted at time 16 s expires, $T_L=6$ which lies between two and two-and-a-half times $T_a$ and thus a positive determination is made at step S230 resulting in a change to RDI from 20 s to 10 s (twice the Hello Interval—step S235) which results in a message being sent to the interface Monitoring thread at 21 s which causes the RDI timer to be reset at this time. The Hello Interval timer is also restarted at this time (step S170). Finally at time 26 s, $T_L=11$ seconds which is over three times $T_a$ so a positive determination is made at step S210 which causes the RDI to be changed to zero (step S215); a message is sent to the interface monitoring thread, which declares the neighbouring router as dead and then both threads gracefully terminate themselves shortly thereafter. Thus it can be seen that in FIG. 8b, where $T_s$ is significantly smaller than in FIG. 8a, the neighbouring router is declared as being down some 10 seconds sooner than in FIG. 8a. This illustrates how where a busier router stops sending packets the algorithm reaches the conclusion that it has died more quickly than it does for less busy routers which was the desired behaviour.

Discussion of Interfaces

The term interface is one which is loosely well understood in the art but which can take on slightly different precise meanings in different contexts. In RFC 2328 the term interface is defined as follows:

"Interface:

The connection between a router and one of its attached networks. An interface has state information associated with it, which is obtained from the underlying lower level protocols and the routing protocol itself. An interface to a network has associated with it a single IP address and mask (unless the network is an unnumbered point-to-point network). An interface is sometimes also referred to as a link."

In the present application we use the term "interface" In this way, unless otherwise specified. As mentioned earlier in the application. In some arrangements a single interface will be associated with only a single neighbouring router and any message received over a particular interface can thus be deduced to have arrived from the respective neighbouring router. In other cases however, there may be two or more routers accessible over a single interface, for example where the interface is to an Ethernet network containing three routers in total, say routers A, B and C. In such a situation, if router B wishes to forward an IP packet to router A, Ethernet (link layer) protocols are used to forward the packet. The process (as is well known in the art) is to encapsulate the IP packet within an Ethernet Frame which is then "unicast" to Router A using Router A's Ethernet address; the frame also specifies the Ethernet address of the sending router—i.e. B's Ethernet address. When the frame is received at Router A the IP packet is unencapsulated and forwarded to the IP layer function in Router A. The Ethernet address information of the sending router is normally stripped away at this point and not sent "up" to the IP layer functions. However, it would be a simple matter to use the Ethernet address of the sending router to Identify which router (i.e. B) sent the Ethernet frame containing a particular IP packet and to transmit the identity of the router to an interface monitoring thread operating in accordance with an embodiment of the present invention so that any message can be used as an indication of the health of the sending router.

Such additional functionality is obviously not required in embodiments in which only messages specific to the IP routing protocol (e.g. Hello messages) are used by routers as an indication of the health or otherwise of a neighbouring router.

VARIATIONS

It will be apparent to the reader that many modifications can be made to the above described embodiments without departing from the inventive concept.

For example, in an alternative embodiment, step S156 in FIG. 6 could be omitted. This would mean that the RDI was re-calculated in the event that a Hello message is not received during the preceding Hello Interval even if one or more normal packets have been received during this interval. Indeed, with a very short $T_a$ (i.e. if the average time between the times of receipt of normal packets is very short) it would be possible for the Adaptive RDI algorithm to declare a neighbouring router dead even if only one Hello message has been missed and there have even been some normal packets received during the interval. This might be appropriate in the case of very busy interfaces where packets arrive very regularly and so even a gap of just a few seconds is likely to be indicative of a fault in the neighbouring router or the connection thereto.

As a further alternative to the adaptive RDI algorithm, both normal packets and Hello Messages could be used to update $T_a$.

Many other similar such variations will doubtless occur to a person skilled in the art.

The invention claimed is:

1. A method of operating a data network of the type in which a number of router devices forward received packets of data towards a destination node using the Internet Protocol wherein:
   each router maintains a routing table, indicating the next hop to choose in respect of different ultimate destinations, in accordance with a routing protocol wherein neighboring routers periodically communicate with one another and wherein such communications are used by routers as confirmation that they are still able to communicate with one another, and
   each router compares the time since it last communicated in this way with each of its neighbors with a router dead interval and determines that the respective neighboring router, or the currently designated route thereto, has gone down in the event that the comparison indicates that the router dead interval has elapsed without such a communication having been received from the respective router, and
   each router performs an adaptive algorithm to modify the or each corresponding router dead interval dynamically in accordance with one or more properties of the network as measured by the router.

2. A method according to claim 1 wherein one said property of the network used in controlling how the router dead interval is dynamically varied is a parameter indicative of the amount of congestion suffered by each respective neighboring router.

3. A method according to claim 1 wherein one said property of the network used in controlling how the router dead interval is dynamically varied is a parameter which is indicative of an average time between the receipt of IP packets or other data messages received, or recently received, from a respective neighboring router.

4. A method according to claim 3 wherein the router dead interval is set to a shorter duration when the indicative parameter is smaller than when it is greater.

5. A method according to claim 1 wherein the protocol is one in which any communication arriving from a neighboring router, including IP packets forwarded by the neighboring router but originating from another point in the network, are used by the receiving router as confirmation that the sending router is still operating correctly.

6. A method according to claim 5 further comprising identifying the forwarding router in respect of a received IP packet at a link or other layer function operating beneath the IP layer.

7. A method of operating a data network of the type in which a number of router devices forward received packets of data towards a destination node using the Internet Protocol wherein:
   each router maintains a routing table, indicating the next hop to choose in respect of different ultimate destinations, in accordance with a routing protocol wherein neighboring routers periodically communicate with one another and wherein such communications are used by routers as confirmation that they are still able to communicate with one another, and
   each router compares the time since it last communicated in this way with each of its neighbors with a router dead interval and determines that the respective neighboring router, or the currently designated route thereto, has gone down in the event that the comparison indicates that the router dead interval has elapsed without such a communication having been received from the respective router,
   the router dead interval is dynamically varied in accordance with one or more properties of the network as measured by each respective router,
   one said property of the network used in controlling how the router dead interval is dynamically varied is a parameter indicative of the amount of congestion suffered by each respective neighboring router, and
   the parameter indicative of the amount of congestion suffered by a respective neighboring router is the percentage utilization of the central processing unit of the router as reported in a message from the respective neighboring router.

8. A method according to claim 7 wherein the message is a modified Hello message.

9. An Internet Protocol router device for use in a data network comprising a plurality of nodes, wherein packets of data are sent from one node in the network to another on a hop by hop basis, the router including:
   a data store for storing a routing table indicating the next hop destination for a received packet on the basis of the ultimate destination specified by the received packet;

a digital processor operable to maintain the routing table on the basis of communications received from neighboring router devices within the network; and a timer for timing the length of time elapsed since last receiving a communication, or a communication of a type which is one of a subset of the possible types of communication, from each of one or more of the router device's neighbors; wherein the data store is further operable to store in respect of each of said one or more of the router device's neighbors a router dead interval; and the digital processor is further operable to compare said length of time elapsed with the corresponding router dead interval in respect of each of said one or more of the router device's neighbors and to ascertain that the corresponding router device is no longer operating correctly if the comparison indicates that a length of time equal to or greater than the router interval has elapsed without receiving a said communication, or a said communication of a type which is one of a subset of the possible types of communication, from said neighboring router device;

wherein the digital processor is further operable to dynamically vary the or each router dead interval in accordance with one or more properties of the network.

10. A data network or internetwork comprising a plurality of routers according to claim 9.

11. A non-transitory, computer readable storage medium tangibly storing instructions for operating a data network of the type in which a number of router devices forward received packets of data towards a destination node using the Internet Protocol wherein:

each router maintains a routing table, indicating the next hop to choose in respect of different ultimate destinations, in accordance with a routing protocol wherein neighboring routers periodically communicate with one another and wherein such communications are used by routers as confirmation that they are still able to communicate with one another, and each router compares the time since it last communicated in this way with each of its neighbors with a router dead interval and determines that the respective neighboring router, or the currently designated route thereto, has gone down in the event that the comparison indicates that the router dead interval has elapsed without such a communication having been received from the respective router, and each router performs an adaptive algorithm to modify the or each corresponding router dead interval dynamically in accordance with one or more properties of the network as measured by the router.

12. A non-transitory, computer readable storage medium according to claim 11 wherein one said property of the network used in controlling how the router dead interval is dynamically varied is a parameter indicative of the amount of congestion suffered by each respective neighboring router.

13. A non-transitory, computer readable storage medium according to claim 11 wherein one said property of the network used in controlling how the router dead interval is dynamically varied is a parameter which is indicative of an average time between the receipt of IP packets or other data messages received, or recently received, from a respective neighboring router.

14. A non-transitory, computer readable storage medium according to claim 13 wherein the router dead interval is set to a shorter duration when the indicative parameter is smaller than when it is greater.

15. A non-transitory, computer readable storage medium according to claim 11 wherein the protocol is one in which any communication arriving from a neighboring router, including IP packets forwarded by the neighboring router but originating from another point in the network, are used by the receiving router as confirmation that the sending router is still operating correctly.

16. A non-transitory, computer readable storage medium according to claim 15 further comprising identifying the forwarding router in respect of a received IP packet at a link or other layer function operating beneath the IP layer.

17. A non-transitory, computer readable storage medium tangibly storing instructions for operating a data network of the type in which a number of router devices forward received packets of data towards a destination node using the Internet Protocol wherein:

each router maintains a routing table, indicating the next hop to choose in respect of different ultimate destinations, in accordance with a routing protocol wherein neighboring routers periodically communicate with one another and wherein such communications are used by routers as confirmation that they are still able to communicate with one another, each router compares the time since it last communicated in this way with each of its neighbors with a router dead interval and determines that the respective neighboring router, or the currently designated route thereto, has gone down in the event that the comparison indicates that the router dead interval has elapsed without such a communication having been received from the respective router, the router dead interval is dynamically varied in accordance with one or more properties of the network as measured by each respective router, one said property of the network used in controlling how the router dead interval is dynamically varied is a parameter indicative of the amount of congestion suffered by each respective neighboring router, and the parameter indicative of the amount of congestion suffered by a respective neighboring router is the percentage utilization of the central processing unit of the router as reported in a message from the respective neighboring router.

18. A non-transitory, computer readable storage medium according to claim 17 wherein the message is a modified Hello message.

* * * * *